United States Patent

[11] 3,574,486

[72] Inventors Hoel L. Bowditch;
Robert C. Prescott, Foxboro; Herbert A. Neuman, Wrentham, Mass.
[21] Appl. No. 772,598
[22] Filed Nov. 1, 1968
[45] Patented Apr. 13, 1971
[73] Assignee The Foxboro Company
Foxboro, Mass.

[54] HIGH PRECISION MINIATURE HALF-CONE ASPIRATOR SYSTEM
1 Claim, 16 Drawing Figs.

[52] U.S. Cl. ................................................ 417/185, 417/198
[51] Int. Cl. .................................................. F04f 5/16
[50] Field of Search .................................... 103/258, 262, 263, 271—274; 230/92, 95, 111, 112; 137/81.5, 85, 115; 417/185

[56] References Cited
UNITED STATES PATENTS

| | | | |
|---|---|---|---|
| 2,952,265 | 9/1960 | Isaacson | 230/111X |
| 3,022,743 | 2/1962 | Engholdt | 103/262X |
| 3,450,335 | 6/1969 | Soriano | 230/95 |
| 3,461,895 | 8/1969 | Colston | 137/81.5 |
| 3,472,257 | 10/1969 | Daruk et al. | 137/81.5 |

Primary Examiner—Robert G. Nilson
Attorney—Lawrence H. Poeton

ABSTRACT: In pneumatic instrumentation a miniature aspirator system in which the aspirator form is channelled in one plate of a sandwich unit, to form half-cone passages apex-to-apex. This lends itself to simple manufacturing techniques and pneumatic circuit plate assembly. An example of application is in a nozzle-baffle system, such as a control unit set point transmitter.

PATENTED APR 13 1971 3,574,486

INVENTOR.
HOEL L. BOWDITCH
ROBERT C. PRESCOTT
HERBERT A. NEUMAN

BY Lawrence H. Poston
AGENT

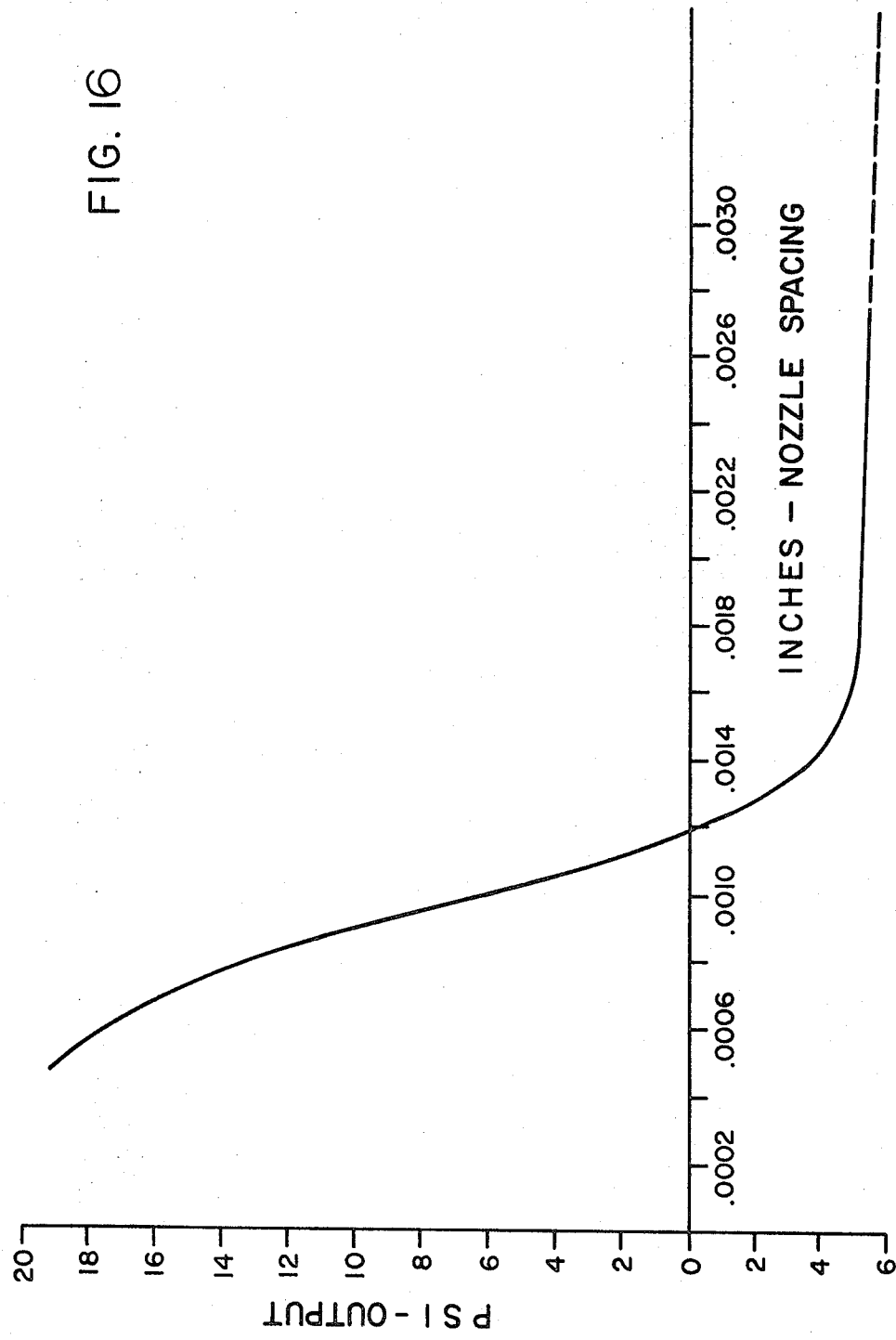

HIGH PRECISION MINIATURE HALF-CONE ASPIRATOR SYSTEM

This invention relates to pneumatic instrumentation of process and energy systems, for example in measurement, control, recording and indicating functions.

It particularly relates to the miniaturization of such instrumentation, in modern installations requiring compactness and inclusion of more and more sophisticated devices. One step in this direction has been the utilization of pneumatic circuit boards, providing compactness and simplicity while maintaining and improving pneumatic circuit integrity, reliability and repeatability.

This invention provides a miniaturized aspirator system for use with modern instrumentation, and in particular, for compatibility with pneumatic circuit board systems.

In order to achieve this aspirator system in miniature and to the necessary high precision, this invention provides a unique half-cone form for both the inlet and recovering cone passages. Thus, in a sandwich of the order of 1 inch by one-half inch by one-sixteenth inch, an aspirator plate is provided with two half-cone channel forms, apex to apex, with an aspirator channel transversely from the common apex point at the throat of the aspirator. The aspirator passage forms are completed by a cover plate, forming the flat side of the half-cone forms. For further precision, the half-cone channels may be made with flat sides, into half-pyramid forms. Suitable passages are provided through the cover plate to and from the aspirator passages, and the sandwich unit may thus be side mounted on a pneumatic circuit board.

An example of an aspirator system in accordance with this invention includes a nozzle-baffle assembly, with a rebalancing bellows. This may be used as a set point transmitter in a pneumatic control system, in this example, a manually operated set point transmitter.

This flapper nozzle in a set point transmitter assembly uses the linearizing aspirator of this invention as an output element rather than a conventional relay. Since this unit is designed to operate into small output capacity, the output air delivery requirement is small. The linearizing aspirator reduces air consumption; yet provides linearity of output vs. flapper position.

The linearizing aspirator uses the venturi principle where the flow through the venturi is established by the flapper nozzle position and the output pressure is obtained from a tap on the venturi throat. With a 20 p.s.i. supply to the aspirator the pressure of the venturi throat can vary from approximately 7 p.s.i. vacuum to greater than 17 p.s.i.g. In the range of 3 p.s.i. to 15 p.s.i., the relationship between flapper nozzle clearance and aspirator output pressure is essentially linear.

As the flapper position is changed, the pressure built up by the flapper-nozzle and the linearizing aspirator changes to reposition the bellows and nozzle combination to rebalance the transmitter assembly. The bellows element is calibrated for a 3—15 p.s.i. output span.

Other objects and advantages of this invention will be in part apparent and in part pointed out hereinafter and in the accompanying drawings, wherein.

Figure 8:
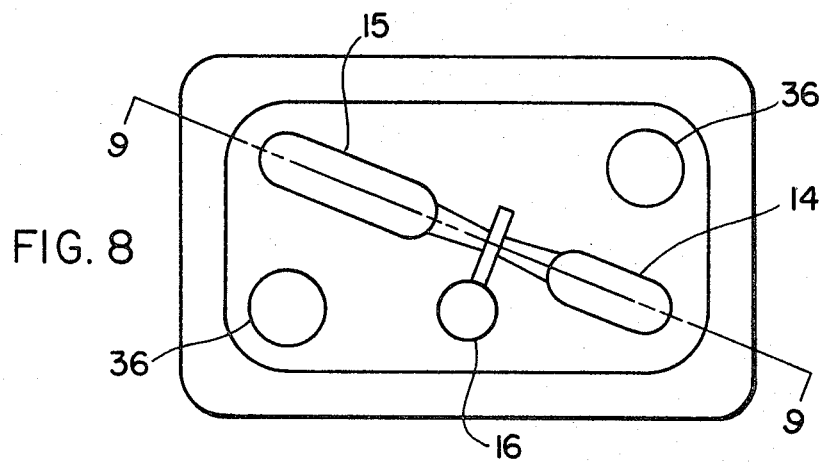
Figure 9:
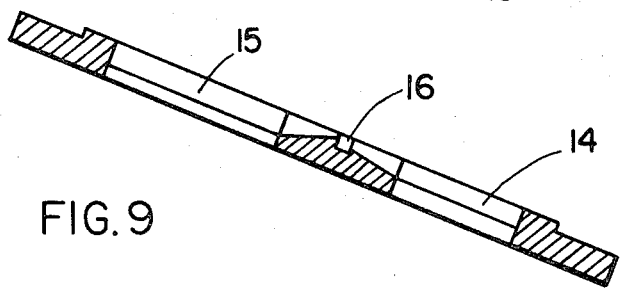
Figure 10:
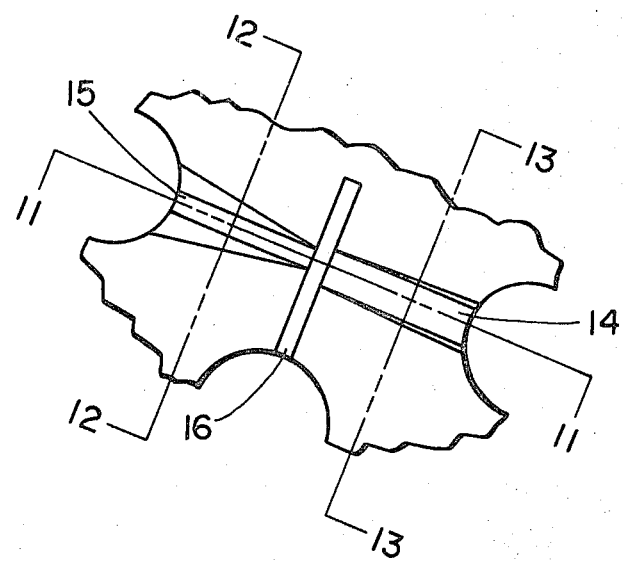
Figure 11:
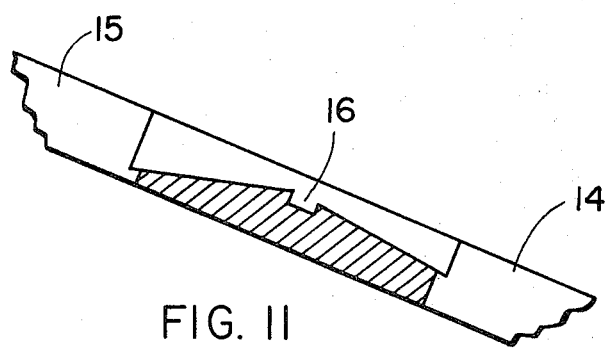
Figure 12:
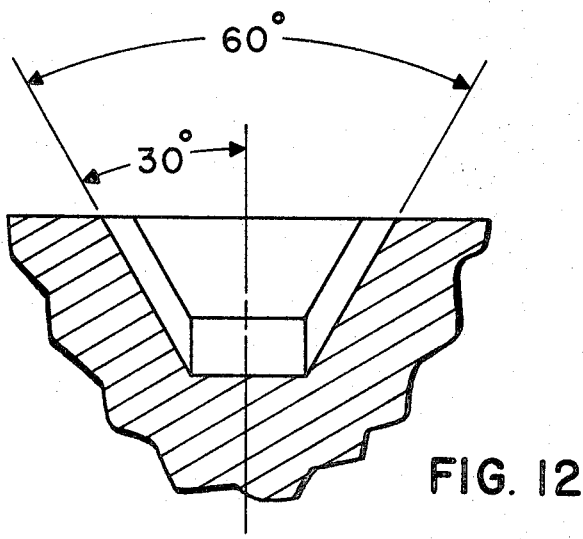
Figure 13:
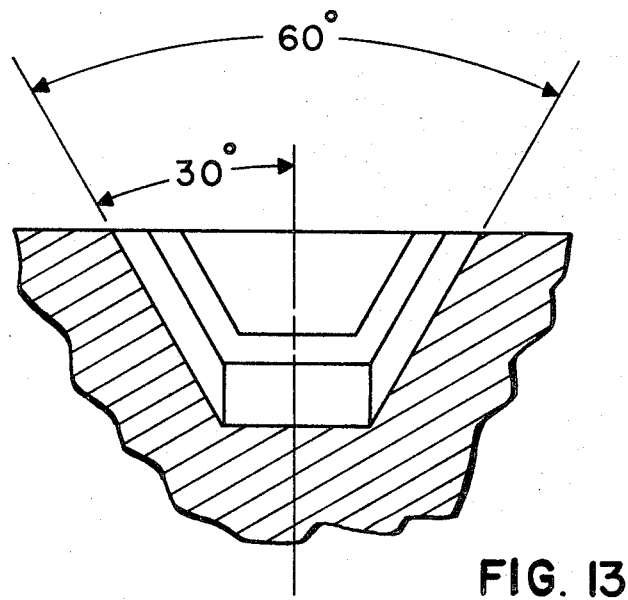

FIGS. 10 through 13 are enlarged views of the immediate aspirator area of the structure of FIG. 8, respectively, FIG. 10 as top view, FIG. 11 as a section on line 11—11 of FIG. 10, FIG. 12 as a section on line 12—12 of FIG. 10, and FIG. 13 as a section on line 13—13 of FIG. 10.

Figure 14:
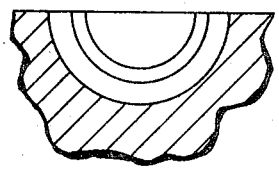
Figure 15:
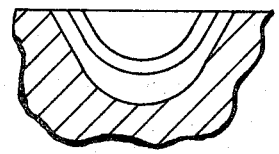

FIG. 14 illustrates a conical form of the structure of FIGS. 10 through 13;

FIG. 15 illustrates another curved form as a variant of the structure of FIGS. 10 through 13; and FIG. 16 is an example of a performance graph of output pressure vs. nozzle-baffle separation in a miniature aspirator system according to this invention.

Figure 1:
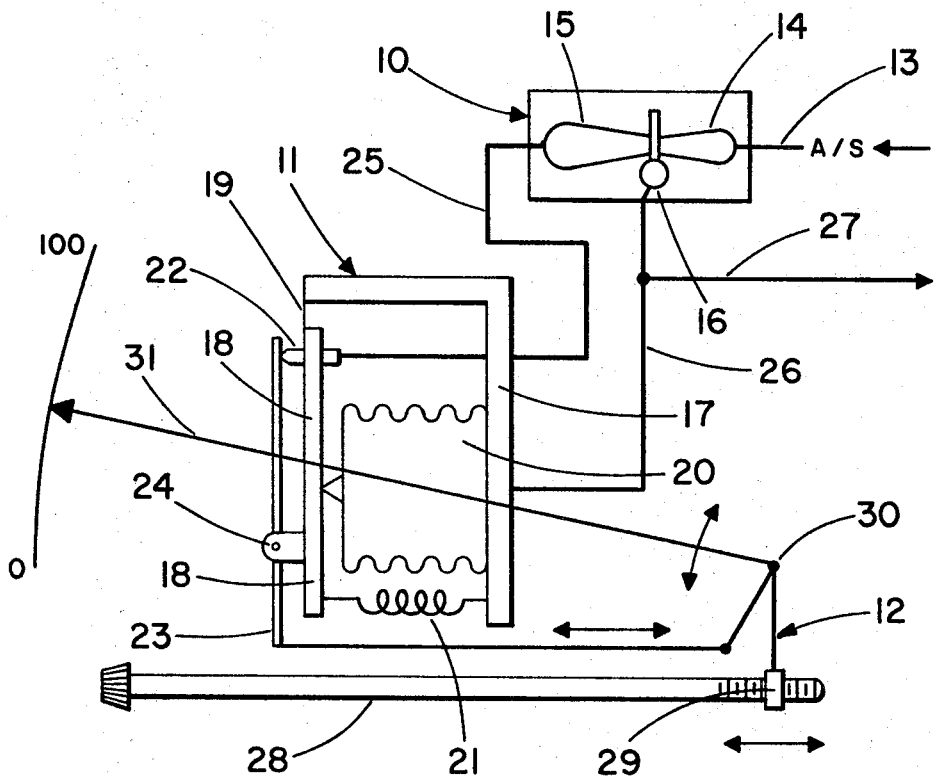
FIG. 1 is a schematic of a miniature aspirator system according to this invention.

In FIG. 1, the showing comprises a miniature aspirator 10, a nozzle-baffle-rebalance bellows combination 11, and mechanical linkage 12.

The aspirator is provided with an air supply at 13, from which air is conducted through the aspirator by way of the inlet half-cone 14 and the recovery half-cone 15. An aspirator passage 16 is provided transversely of this flow, at the throat of the aspirator half-cones, in their apex-to-apex alignment point of meeting.

References to the half-cone form of the aspirator herein are intended to include forms in the nature of half-pyramids, trapezoids, or the like. In each case, the halves are axial, along a plane including the cone or pyramid apex, actual or in extension. Such forms may also be less than half-cone or half the other forms.

The combination 11 comprises a fixed, angled support member 17 which has a flexure 18 mounted thereon in cantilever fashion, with a mounting and pivot area at 19. A bellows 20 has its fixed end secured to the mounting member 17, and its movable end engaging the flexure 18, against the action of an adjustable bias spring 21 which tends to move the flexure 18 towards and against the movable end of the bellows.

A nozzle 22 is also mounted on the flexure 18 at a point near the pivot area 19, and between the pivot area of the flexure and the contact point of the bellows with the flexure. Thus movement of the flexure moves the nozzle in the same direction as the bellows movement, but to a lesser degree.

A baffle arm 23 is mounted on a pivot lug 24 extending from the flexure 18 on the opposite side thereof with respect to the bellows 20, and somewhat further away from the flexure pivot area 19 than is the bellows contact point on the flexure. The baffle 23 is movable about its pivot 24 to variably restrict air flow from the nozzle 22. The nozzle is supplied with air flow from the aspirator recovery half-cone 15 by way of a conduit 25 which may be a passage in a pneumatic circuit board, or may be a flexible tube, to otherwise aid in placement of the nozzle at a distance or in a particular location. The bellows 20 is pneumatically connected to the aspirator passage 16 by a conduit 26, from which an output passage 27 is provided.

The mechanical linkage 12 is provided for manual adjustment of the baffle 23 about its pivot 24. This is accomplished by manual rotation of a shaft 28. This rotation moves a sleeve 29 along a screw thread on the shaft 28, and results in rotation of an arbor 30, with consequent pivoting of the baffle 18, and movement of an indicator arm 31.

In the action of the half-cone aspirator 10, with the nozzle 22 uncovered, the air flow is directly through the aspirator to the nozzle. This action draws air into the aspirator through the passage 16. This can be to the degree of a negative pressure in the bellows 20. With the nozzle covered by the baffle, back pressure creates positive pressure in the bellows and in the output 27.

The operation of the system of FIG. 1, for example as a control unit set point transmitter provides an accurately adjustable output. As the baffle 23 increases the restriction of the nozzle, the bellows pressure increases, and the baffle is moved away from the nozzle in a rebalancing effect. This movement of the flexure by the bellows also moves the nozzle in the same direction, but less. This is convenient and simple nozzle mounting and the nozzle movement is small.

This device lends itself to use as a vacuum regulator since its output range extends from positive gauge pressure to a vacuum range.

Figure 2:
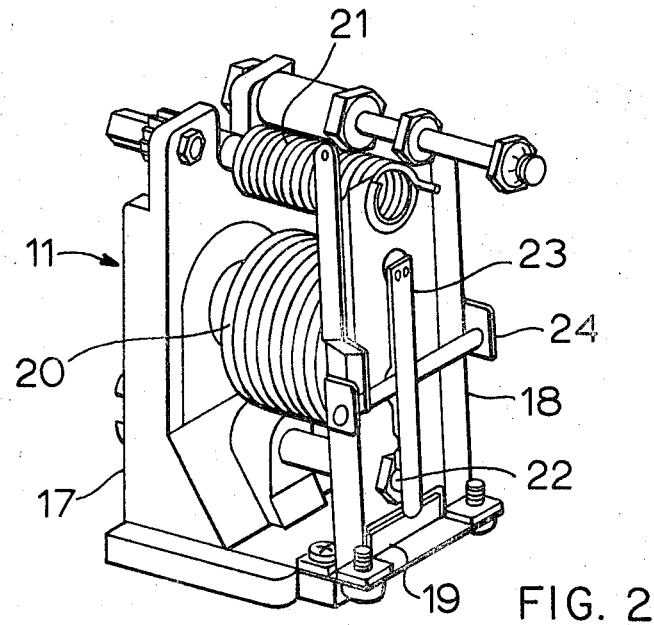
FIG. 2 is a perspective of a nozzle-baffle structure.
Figure 3:
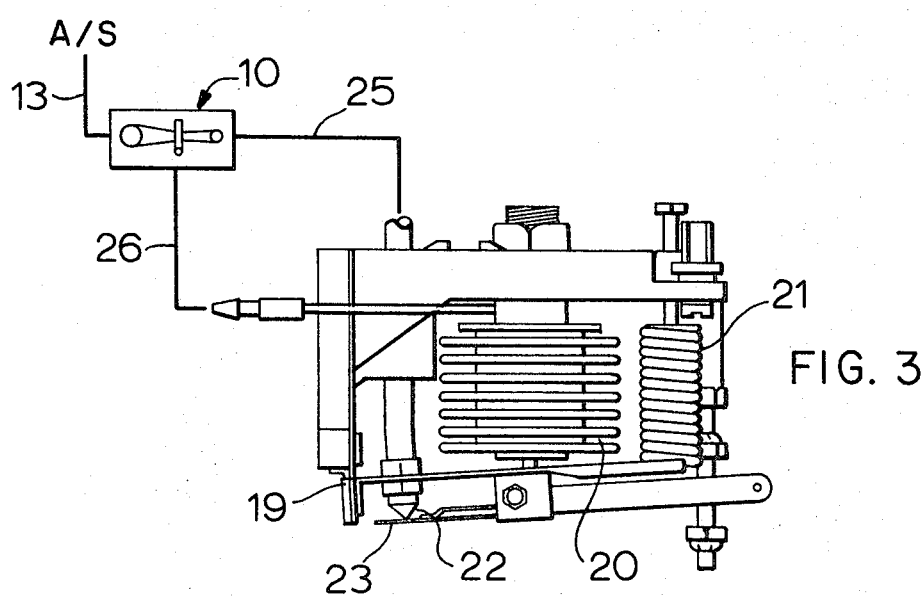
FIG. 3 is a side view of the structure of FIG. 2, with a schematic showing of a miniature aspirator unit therewith.

FIGS. 2 and 3 structurally illustrate the nozzle-baffle-bellows system of FIG. 1. Like reference numbers denote like elements throughout.

Figure 4:
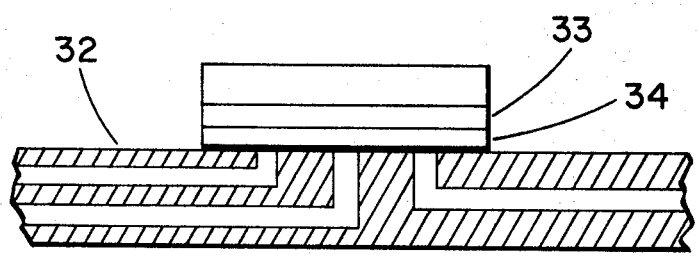
FIG. 4 is an illustration of an aspirator unit according to this invention, as mounted on a pneumatic circuit board.
Figure 5:
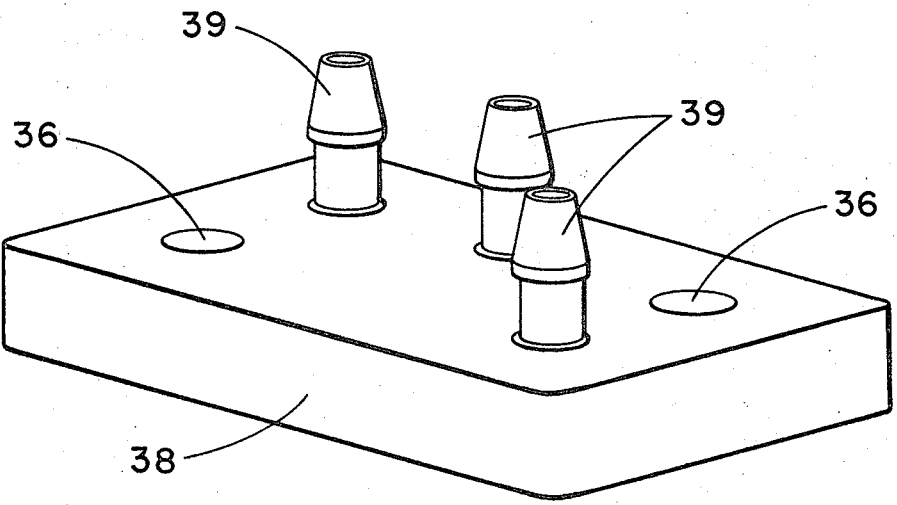
FIG. 5 is an exploded view of one form of miniature aspirator sandwich assembly according to this invention.
Figure 5:
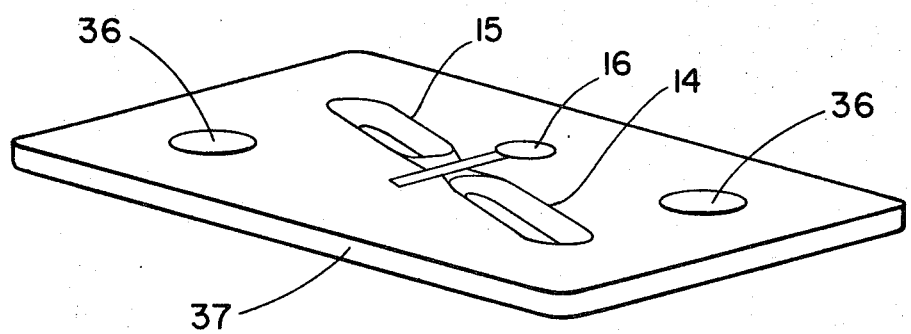
Figure 5:
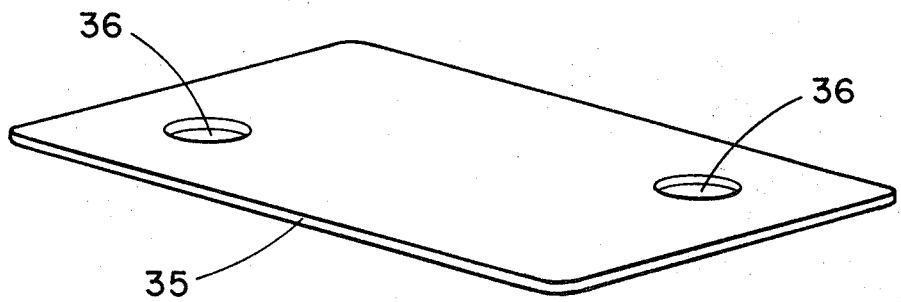
Figure 6:
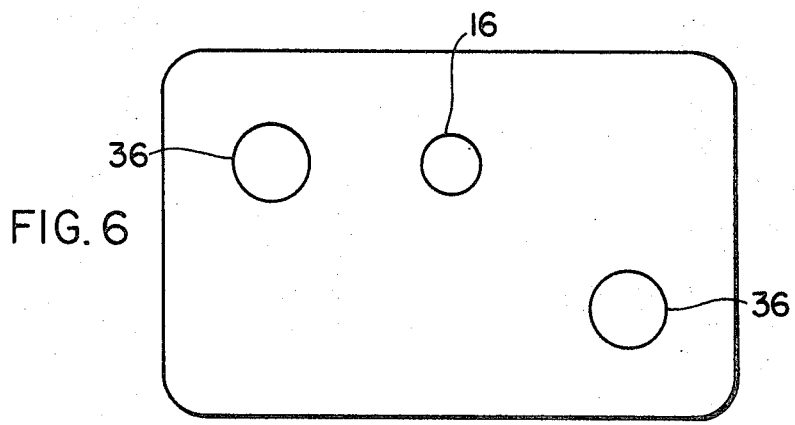
FIGS. 6 through 9 are views of a miniature aspirator plate according to this invention, respectively, outside face, edge, aspirator face, and aspirator section as on line 9—9 of FIG. 8.
Figure 7:
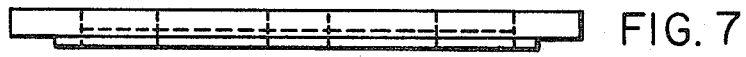

FIG. 4 illustrates the basic elements of the half-cone aspirator sandwich assembly as mounted on a pneumatic circuit board 32, in fragment. The main aspirator plate is indicated at 33, and a cover plate 34. Suitable other sandwich elements may be used as sealing or support devices as needed for specific installations. The exploded view of FIG. 5 further illustrates one form of an aspirator sandwich according to this invention. An outer cover plate is shown at 35 with only mounting holes 36 therethrough. The aspirator plate is shown at 37, and an inner cover plate at 38. The mounting holes 36 are common to all, and the cover plate 38 may be under surface formed to provide a sealing contact with the top of the aspirator plate 37. Further, the top of the cover plate 38 may be mounted against a circuit board, or, with tube connectors 39, may be otherwise connected into suitable pneumatic circuitry.

The various views of the aspirator plate and the aspirator area in the plate shown in FIGS. 6 through 13 detail the specific formations of the aspirator as generally a half-cone aspirator, and specifically in FIGS. 10 through 13, as a half-pyramid aspirator with a rectangular slot transverse aspirator passage.

FIGS. 14 and 15 respectively illustrate a true conical form, and a curved variant between the true cone and the form of FIG. 13, as examples of alternative structures according to this invention.

The miniature nature of the aspirator and its sandwich plate form, is shown in that the sandwich unit may be less than 1/16" thick.

The performance curve of FIG. 16 emphasizes the effectiveness of the miniature aspirator according to this invention, both as to linearity and as to ability to aspirate in the region of negative pressure.

This invention therefore provides a new and useful pneumatic instrumentation system component in the form of an aspirator formed as part of a cone, pyramid, trapezoid or the like. This can be accomplished, for example, by plastic molding.

We claim:
1. A manually operated pneumatic set point transmitter comprising:
   a fixed support with a base and a side;
   an arm flexibly mounted on the top of said support side and extending over said base as a cantilever;
   a nozzle secured to said cantilever arm adjacent said flexible mounting and said support side;
   a bellows having one end fixed to said support base and the other end with means engaging said cantilever arm to flex said arm away from said base upon expansion of said bellows;
   a spring connecting the outer end of said cantilever arm with said base and holding said arm against said bellows engaging means;
   a pivot boss secured to the outer face of said cantilever arm at a point between said spring and said bellows engaging means;
   a lever pivotally mounted to said pivot boss and extending along said cantilever arm to restrictably overlie said nozzle;
   manually adjustable linkage means for adjusting said nozzle restriction by moving said lever and simultaneously indicating said manual adjustment; and a pneumatic system comprising an aspirator, an air supply to said nozzle through said aspirator, a pneumatic connection from the throat of said aspirator to the interior of said bellows, and a pneumatic output from said connection;
   said aspirator comprising a plate with an input slot tapered smaller in to the throat of said aspirator, an output slot tapered larger out from the throat of said aspirator, a side access slot from said throat, and a flat sandwich plate covering said slots to form pneumatic passages thereof.